United States Patent

Burnett

[15] 3,703,617
[45] Nov. 21, 1972

[54] AUTOMATIC DISCONNECT FOR A VEHICULAR BATTERY

[72] Inventor: Marvin D. Burnett, Route 2, Alpharetta, Ga. 30201

[22] Filed: Oct. 16, 1970

[21] Appl. No.: 81,225

[52] U.S. Cl.................................200/61.5, 180/104
[51] Int. Cl.............................................H01h 35/14
[58] Field of Search..............180/104; 200/61.5, 161

[56] References Cited

UNITED STATES PATENTS

| | | | |
|---|---|---|---|
| 3,022,392 | 2/1962 | Clemson | 200/61.5 |
| 3,180,524 | 4/1965 | Shepard et al. | 222/5 |
| 2,860,213 | 11/1958 | McNamara | 200/161 |
| 3,509,894 | 5/1970 | Brooke | 180/104 X |
| 2,236,872 | 4/1941 | Grigsby | 200/61.5 |
| 2,778,896 | 1/1957 | Tollefsen | 200/61.5 |
| 1,411,298 | 4/1922 | Osborn | 180/104 X |
| 2,796,479 | 6/1957 | Walkup | 200/61.5 |

FOREIGN PATENTS OR APPLICATIONS

| | | | |
|---|---|---|---|
| 499,274 | 1/1954 | Canada | 180/104 |
| 423,191 | 1/1935 | Great Britain | 180/104 |
| 736,180 | 1932 | France | 200/61.5 |

*Primary Examiner*—Robert J. Spar
*Attorney*—Newton, Hopkins & Ormsby

[57] ABSTRACT

An automatic battery disconnecting device for vehicles comprising a hollow, non-conducting housing containing a pivotally mounted pendulum member temporarily supporting a spring-biased pin in an upright operative position, and having a contact member in conducting, bridging engagement with the bottom of two terminals which project through the top of the housing, the terminals being connected in series with the battery of the electrical system of a vehicle. The pendulum members supports the pin in such a manner as to separate from the pin upon an excessive swing of the member, thus allowing the pin to be urged downward by the spring, causing the pin to come to an inoperative position with the contact member being disengaged from the terminals, thereby opening the electrical circuit of the vehicle. The pendulum member would undergo an excessive swing whenever the vehicle, in which the invention is mounted, suddenly experiences an impact or collision. The pin is provided with reset means for reengaging the pin with the pendulum member so as to return the pin to its operative position with the contact member again in conducting engagement with the terminals, closing the electrical circuit within the vehicle. The invention prevents electrical fires due to short circuits whenever the vehicle undergoes any of the above conditions.

3 Claims, 3 Drawing Figures

PATENTED NOV 21 1972

3,703,617

INVENTOR.
MARVIN D. BURNETT
BY Newton, Hopkins & Ormsby
ATTORNEYS

AUTOMATIC DISCONNECT FOR A VEHICULAR BATTERY

BACKGROUND OF THE INVENTION

This invention relates to a vehicular circuit-breaking device and more particularly to an automatic battery disconnect device for a vehicle which instantaneously operates when the vehicle experiences an impact or collision, thus preventing electrical fires due to short circuits.

Automatic devices for disconnecting the electrical circuits of a vehicle from its battery when the vehicle is involved in a collision have been developed in the past. By design and operation, however, these mechanisms have proved to be unreliable in their use and susceptible to malfunctions. This was because most of these devices employed systems involving complicated mechanical linkages and electrical circuits.

SUMMARY OF THE INVENTION

Briefly described, the present invention, as disclosed in the abstract hereof, includes a non-conducting closed hollow housing provided at one end with a pair of spaced terminals. These terminals are in series in the main circuit of a battery in the electrical system of the automobile. An electrically conducting flat, disc-shaped resilient contact member is adapted to short across or close the circuit between the two terminals when it is moved into contact therewith, the contact member being moveable to a disconnected position in spaced relationship to both terminals.

The contact member is radially disposed on and carried by a moveable shaft or pin passing through the central portion of the contact member. The outer end of the pin is slideably journalled in the housing and projects outwardly of the housing, being provided, externally of the housing with a transverse or radially extending reset handle. Within the housing is a helical or coiled spring surrounding the pin, with the housing and the contact member. The spring yieldably urges or biases the contact member to its open position and a retaining ring riding in a peripheral groove in the central portion of the pin, limits inward movement of the contact member with respect to the pin.

The lower end portion of the pin projects into the central part of the canty of the housing and is provided at its lower extremity with a concave recess.

A partition or ledge in the central part of the housing below or spaced from the end of the pin supports, for universal movement, a rigid pendulum member. The pendulum member includes a rigid shaft projecting through a pivot ball carried by the partition. The innermost end of this shaft in the recess of the pin when the axes of the shaft and pin are aligned. The outermost or bottommost end of the shaft is provided with a weight. When the weight is at rest, the axes of the inner or upper end portion of the shaft and pin are aligned so that the shaft supports the pin in a position seating the contact member on the two terminals for closing the circuit therebetween.

The initial seating and subsequent reseating of the pin recess on the end of the shaft is accomplished by withdrawing the handle sufficiently to compress the coiled spring and also flex the contactmember sufficiently to withdraw the recess slightly from the end of the shaft so that the shaft is brought by gravity acting on the weight into alignment with the pin. Thereafter, the handle is released and the coiled spring will urge the recess to its seated position. The dimensions are such, however, that this slight movement to a seated position will not be sufficient to open the circuit created by the contact member, the contact member simply flexing on the terminals for the movement.

When the handle is withdrawn completely, it can be rotated so that a radially projecting finger is moved into overlying relation to the housing. Such rotation locks the contact member in its closed position.

A bracket mounts the housing in an upright position so that when set, any appreciable lateral shock will pivot the pendulum and thereby release the pin from its seated position so that the coiled spring urges the pin and contact member inwardly of the housing to open the circuit.

It is therefore, the primary object of this invention to provide a battery disconnecting device that will automatically open the vehicle's electrical circuitry when the vehicle is in an accident, thereby preventing electrical fires due to short circuits.

It is a further object of this invention to provide a vehicular circuit breaker which is simple in design, inexpensive to manufacture and durable in its construction, and reliable in its use.

It is still a further object of this invention to provide a automatic battery disconnect device which employs a minimum of moving parts, is compact in size, and can be readily installed in any vehicle.

Other objects, features, and advantages of the present invention will become apparent from the following description when taken in conjunction with the accompanying drawing wherein like characters of reference designate corresponding part throughout the several views.

BRIEF DESCRIPTION OF THE FIGURES OF DRAWINGS

DESCRIPTION OF THE INVENTION

Figure 1:
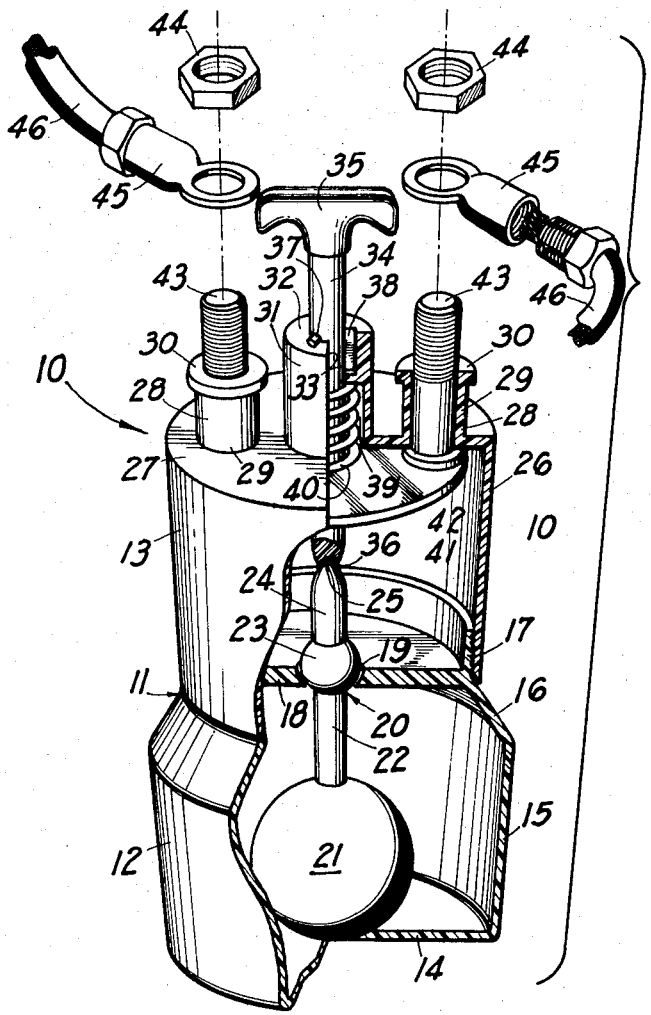
FIG. 1 is a perspective view of an automatic battery disconnecting device constructed in accordance with the present invention, part of the device being broken away for clarity.
Figure 2:
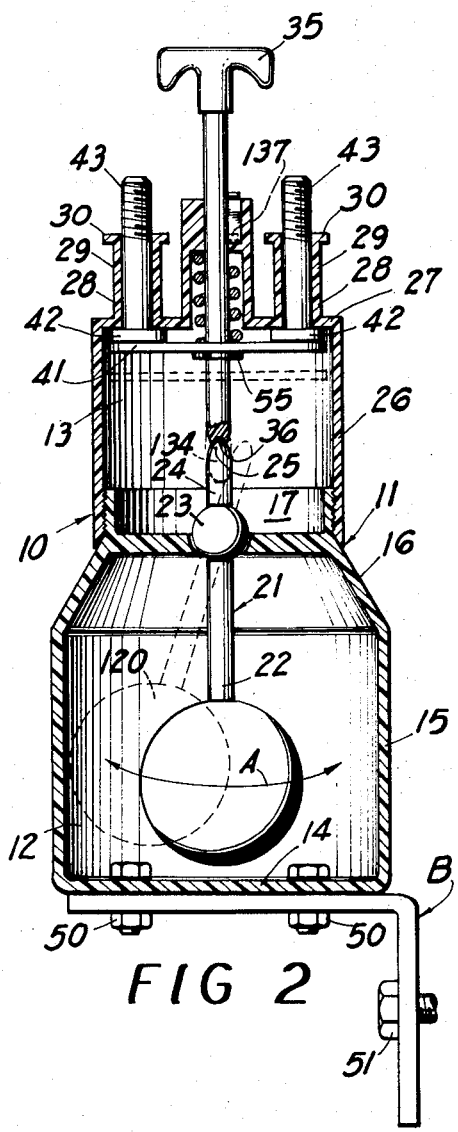
FIG. 2 is a vertical sectional view of the device of FIG. 1.
Figure 3:
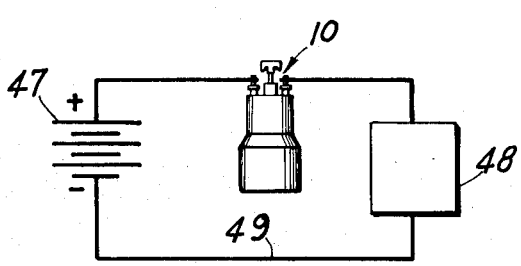
FIG. 3 is an electrical schematic diagram showing the device in relation to the vehicular battery and the vehicle's circuitry.

Referring now in detail to the embodiment chosen for the purpose of illustrating the present invention, numeral 10 denotes generally the automatic vehicular battery disconnecting device depicted in FIGS. 1, 2 and 3.

This device 10 includes a substantially hollow housing 11 which is comprised of a lower portion 12 and an upper portion 13. The housing 11 is constructed of an electrically insulating material such as plastic or hard rubber. The lower portion 12 includes a flat circular base 14 having an upstanding cylindrical wall 15 connected around the periphery of the base 14. The wall 15 terminates in an inwardly tapering section 16 which terminates with a vertical exteriorly threaded annular lip 17. With the lower portion 12 of the housing 11 and located at the junction of the top of the tapering section 16 and the bottom of the lip 17, there is connected a horizontally extending pivotal shelf 18. Located in the center of the pivotal shelf 18 is a concave, recessed hole 19 which functions as a socket in which the pendulum member 20 is supported up from the surface of base 14.

The pendulum member 20 is a non-conducting member and comprises at its bottom end a heavy weight 21, preferably a large ball as shown in FIGS. 1 and 2 constructed of some hard plastic or non-conducting metal. The weight 21 is of such a diameter so as to allow the pendulum member 20 to undergo an excessive swing within the lower portion 12 without first contacting the interior surface of wall 15.

Extending upwardly from the weight 21 is a tubular connecting member 22 which terminates at the bottom of the hole 19 with a bulbous pivotal member 23. The bulbous member 23 is of such a diameter so as to rest within the hole 19, thus supporting the pendulum member 20 in an upright position. The bulbous member 23 has a smooth, outer surface to allow it to be in cooperative engagement with the surface of the concave hole 19. The bulbous member 23 and the concave hole 19 allow the pendulum member 20 to freely swing or pivot in any direction.

Upwardly projecting from the bulbous member 23 is a rigid, tubular support member 24 of pendulum member 20. The support member 24 extends into the upper portion 13 of the housing 11 and terminates with a rounded tip 25.

The upper portion 13 consists of an upstanding, cylindrical wall 26 with threads extending along a portion of the bottom inside surface of the wall 26 so as to threadily receive the threaded annular lip 17 of the bottom portion 12 of the housing 11. The diameter of wall 26 is of a smaller diameter than the wall 15 of the lower portion 12. The wall 26 terminates with the top 27 of the housing 11, the top 27 being a flat circular member with three cylindrically shaped vertical protrusions through its surface.

Two of these protrusions are terminal housings 28 consisting of upstanding hollow cylindrical walls 29 which communicate with the interior of the upper portion 13 of the housing 11. Annular, outwardly projecting flanges 30 extend about the top end of housing 28.

Located in the center of the top 27 and between terminal housings 28 is an outwardly extending, journal member 31 which is hollow and cylindrical in shape. Journal member 31 is of a greater height than terminal housings 28 and terminates with a flat top 32. A hole 33 extends through the member 31 and communicates with the interior of the upper portion 13.

Extending through hole 33 and into the interior of the housing 11 is a spring-biased pin 34. Pin 34 is a non-conducting, one piece member having a transverse reset handle 35 connected to it at its outer end which is exterior of the housing 11. The other end of the pin 34 is located within the interior of the upper portion 13 and has a small aperture 36 located at its rounded tip. The tip 25 of the support member 24 is positioned within the aperture 36 when the pin 34 is in its operative position. The pin 34 has a horizontally projecting stud or finger 37 positioned on it so that when the pin 34 is in its operative position, the stud 37 is in alignment with the top 32 of the journal 31 and in alignment with a groove 38. The groove 38 extends vertically through the journal 31 and terminates forward of the top of the spring cavity 39. Spring cavity 39 is a cylindrical recess within depression 31 which outwardly opens into the interior of the upper portion 13 of housing 11.

Positioned within the spring cavity 39 around the pin 34 is a spring 40. The spring 40 is secured into position at one end by the top of the spring cavity 39 and at its other end by the contact member 41.

Contact member 41 is a flat, flexible or resilient, disc-shaped, electrically conducting plate which is circumferentially displaced in a horizontal position about a portion of pin 34. A contact member 41 is of such a diameter so as simultaneously to conductively engage the contact heads 42 of the terminals bolts 43. A retainer ring 55 received in a peripheral groove in pin 34 prevents downward movement of the contact member 41 on pin 34.

The contact heads 42 are electrically conducting flange-like members which are of a slightly larger diameter than terminal housings 28. Terminal bolts 43 are electrically conducting and project upwardly through the terminal housings 28 with the portions which are the exterior of the terminal housings 28 being threaded so as to receive the nuts 44. The nuts 44 secure cable leads on the terminal bolts 43 and onto the tops 30 of the terminal housings 28. The cable leads 45 are connected to cables 46 which are either the cable on the battery itself or cables which lead into the battery cable.

The housing 12 is supported by the body of a vehicle in an upright position. A bracket B and bolts 50 passing through base 14 secure the housing 12 in place while bolts 51 secure the bracket B to the vehicle.

OPERATION

As shown in FIG. 3, the automatic vehicular battery disconnecting device 10 is mounted in a vehicle along cable 46 between the battery 47 and the vehicle's electrical circuitry, shown schematically as numeral 48. Preferably the device 10 is connected along the positive or "hot" cable of battery 47. Cable 49 leading from the electrical circuit 48 is connected to the other terminal of the battery 47, thus completing the vehicle's electrical circuit. The device 10 can be mounted within the vehicle by any suitable means, usually by a bracket B as described above.

As best seen in FIG. 2, the pin 34 is in its operative position, indicated with heavy lines, when it is supported by pendulum member 20. With the pendulum member 20 and the pin 34 in vertical alignment, the tip 25 of the support member 24 is positioned within the aperture or recess 36 of the pin 34, thus upwardly urging the spring-loaded pin 34 with the contact member 41 conductively engaging the contact heads 42 of the terminal bolts 43. With the pin 34 in its operative position, the contact member 41 freely conducts the electrical current from one terminal bolt 43 to the other, closing the electrical circuit within the vehicle.

If the vehicle in which the invention is mounted is suddenly decelerated, experiences an impact or collision, or otherwise severely vibrated or jolted, the weight 21 of the pendulum member 20 will undergo an excessive swing within lower portion 12 along arrow A. The design of the socket 19, bulbous member 23, tip 25, and aperture 36 are such that irregardless from what direction the vehicle is hit or if it hits another object, the weight 21 will experience a swing. When the pendulum member 20 is swung to position 120, the tip 25 becomes disengaged from the aperture 36, allowing the pin 34 to be urged vertically downward to its inoperative position 134 by the spring 40 with the contact member 41 being disengaged from the contact heads 42, and assuming position 141. The electrical circuit of the vehicle is thereby opened with the possibility of an electrical fire occuring because of short circuits in any part of the electrical system being almost eliminated. When the pin 34 projects downward to position 134, the stud 37 moves down the groove 38 to its bottom, assuming position 137. The stud 137 stops the downward moving of the pin 34 before the tip of the pin 34 touches and possibly damages the bulbous member 23, but the stud 37 allows the pin 34 to be urged downward enough so that contact member 41 becomes disengaged from the contact heads 42. With the pin 34 in its inoperative position 134, the support member 124 rests against the bottom of pin 134.

The device 10 may be reset to close the vehicle's electrical circuitry in two different ways. In the first, the operator pulls the reset handle 35 upward as the reset handle 35 is pulled upwardly, the pin 34 rises from its inoperative position 134 with the contact member 41 again encountering the contact heads 42 of the terminal bolts 43. To allow the pendulum member 120 to resume its position 20 in vertical alignment with the pin 34, the tip of pin 34 must be raised slightly above the tip 25 of the support member 24. The resilient contact member 41 allows this operation to be accomplished by bending upwardly as the pin 34 is pulled up slightly more until the pendulum member 20 regains its vertical position under pin 34. When the reset handle 35 is released, the pin 34 again comes to rest on the support member 24 of the pendulum member 20 with the tip 25 reengaging the aperture 36 of the pin 34. The contact member 41 again becomes in conducting bridging engagement with the contact heads 42. The vehicle's electrical circuit is thus closed and the vehicle may now be operated.

The other reset method is used when the vehicle is on an incline, preventing the pendulum member 20 from returning to a vertical position. In this situation, the operator pulls the reset handle 35 upwardly until the stud 37 is in alignment with the top 32 of the depression 31. The handle 35 is then rotated in either direction to remove the stud 37 from alignment with the groove 38. The operator allows the stud 37 to rest on the top 32 of the journal 31 for maintaining the pin 34 in its operative position. Since the contact member 41 is of a circular design, it is always in conducting engagement with the contacts heads 42 irregardless of where the stud is positioned on the top 32. When the vehicle again assumes level ground, the operator may then rotate the reset handle 35 until the stud 37 is in alignment with the groove 38. The pin 34 will then be in its normal operative position.

As can be seen, therefore, the device 10 provides a means for rapidly disconnecting a battery due to the fact that the contact member 41 is not carried by the pendulum member 20 but is carried by the pin 34. If the contact member 41 is directly connected to the pendulum member 20, the contact member 41 would slowly be disengaged from the terminal bolts 43 as the pendulum 41 began to swing. This would allow a greater chance for arcing, increasing the risk of a fire. This construction would not afford as quick a disconnection as the disclosed embodiment.

Also due to the construction of the device 10, the contact member 41 will not be disengaged from the terminal bolts 43 if the vehicle in which the device 10 is mounted assumes a position other than horizontal. The contact member 41 will be in its operative position irregardless of whether the vehicle is proceeding along a level road or going up or down a hill. The device 10 will not be activated unless the vehicle experiences a jolt or shock as experienced in a wreck. With the spring 40 strongly urging the pin 34 downward upon the pendulum member 20 it taken an excessive jolt to operate the device 10.

It is thought that the invention and its advantages will be understood from the foregoing description and it is apparent that various changes may be made in the form, construction, arrangement of parts, and operation of the invention without departing from the spirit and scope of the invention without departing from the spirit and scope of the invention or sacrificing its material advantages, the form hereinbefore described and illustrated in the drawing being merely the preferred embodiment thereof.

I claim:

1. An automatic battery disconnecting device for connection with the battery in an electrical circuit of a vehicle for automatically opening the circuit when the vehicle receives an impact, comprising:

a. a hollow housing having an upper portion and a lower portion, said upper portion being cylindrical and being threadedly engaged by one end with said lower portion, said upper portion having a top closing said other end;

b. shelf means separating said upper and lower portion; said shelf means being provided with a central socket;

c. a pendulum member including a weight within said lower portion and a rigid connecting member projecting from said weight through said socket and terminating in an upper end within said upper portion;

d. a bulbous member intermediate the ends of said connecting member in said upper portion and riding upon the upper surface of said socket for limiting downwardly movement of said pendulum member, said bulbous member and said socket permitting said weight to swing;

e. a pair of spaced electrical terminals projecting through said upper portion and terminating adjacent said top;

f. a contact member within said upper portion for making an electrical circuit between said terminals when said contact member is contacting both of said terminals;

g. an axially moveable pin projecting through said top for carrying said contact member, the lower end of said pin when said pin is in its upper position, being adapted to rest upon and be supported by said upper end of said connecting member such that said contact member is contacting both said terminals; and h. spring means for urging said pin and said contact member toward said socket for moving said contact member away from said terminals when said lower end of said pin is not resting on said upper end of said connecting member.

2. The structure defined in claim 1 wherein said contact member is a flat flexible disc and said contact member and said pin are so dimensional that said contact member is flexed by contact with said terminals when it is contacting said terminals and said pin is resting upon the upper end of said connecting member.

3. The structure defined in claim 1 including a handle on the end of said pin for moving the same and rotating it axially, a radially extending stud projecting from said pin and wherein said top is provided with an axially extending groove within which said stud rides when said pin is moved axially and a top portion for receiving said stud when said pin is in its upper position and said pin is rotated to misalign said stud with said groove.

* * * * *